(12) United States Patent
Hada

(10) Patent No.: US 8,269,851 B2
(45) Date of Patent: Sep. 18, 2012

(54) IMAGE PICKUP DEVICE AND IMAGE PICKUP METHOD TO SET IMAGE CAPTURING CONDITION

(75) Inventor: Tetsuya Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 12/500,485

(22) Filed: Jul. 9, 2009

(65) Prior Publication Data

US 2010/0013945 A1 Jan. 21, 2010

(30) Foreign Application Priority Data

Jul. 17, 2008 (JP) ................................ 2008-185983

(51) Int. Cl.
H04N 5/232 (2006.01)
G03B 17/40 (2006.01)
(52) U.S. Cl. ................. 348/222.1; 348/333.02; 396/264
(58) Field of Classification Search .................. 396/264; 348/222.1, 333.01, 333.02
See application file for complete search history.

(56) References Cited

U.S. PATENT DOCUMENTS

| 6,101,336 | A * | 8/2000 | Nonaka .......................... 396/264 |
| 2001/0053292 | A1 | 12/2001 | Nakamura |
| 2002/0081114 | A1* | 6/2002 | Aizawa et al. ................ 396/376 |
| 2006/0284990 | A1* | 12/2006 | Ho et al. ...................... 348/222.1 |
| 2006/0291846 | A1* | 12/2006 | Hosoya et al. ............... 396/123 |
| 2007/0237513 | A1* | 10/2007 | Sugimoto et al. ........... 396/123 |
| 2007/0274703 | A1 | 11/2007 | Matsuda |
| 2007/0286589 | A1* | 12/2007 | Ishiwata et al. .............. 396/125 |
| 2008/0025710 | A1 | 1/2008 | Sugimoto |
| 2008/0122943 | A1 | 5/2008 | Itoh |
| 2008/0266419 | A1* | 10/2008 | Drimbarean et al. ...... 348/229.1 |
| 2009/0027513 | A1* | 1/2009 | Sako ........................... 348/222.1 |
| 2009/0244296 | A1* | 10/2009 | Petrescu et al. .............. 382/293 |

FOREIGN PATENT DOCUMENTS

| CN | 101086599 A | 12/2007 |
| JP | 04-340874 A | 11/1992 |
| JP | 2006-005662 A | 1/2006 |
| JP | 2006-301172 A | 11/2006 |
| JP | 2007-281647 A | 10/2007 |
| JP | 2008-054288 A | 3/2008 |
| JP | 2008-054295 A | 3/2008 |
| JP | 2008-078712 A | 4/2008 |
| JP | 2008283456 A * | 11/2008 |

* cited by examiner

*Primary Examiner* — Jason Whipkey
(74) *Attorney, Agent, or Firm* — Canon USA, Inc., IP Division

(57) ABSTRACT

To provide a camera determining a subject for which an image capturing condition is set at the time determined based on whether or not the subject is detected before an image capturing instruction is issued. The subject is detected, it is determined whether the subject detection result satisfies a predetermined condition, the subject for which the image capturing condition should be set is determined before the image capturing instruction is accepted when the subject detection result satisfies the predetermined condition, the image capturing instruction is accepted, the image capturing condition is set based on the determined subject when the subject detection result satisfies the predetermined condition and the image capturing condition is set based on the subject detection result obtained after the image capturing instruction is accepted when the subject detection result does not satisfy the predetermined condition, and actual image capturing is performed under the set image capturing condition.

16 Claims, 7 Drawing Sheets

IMAGE PICKUP DEVICE AND IMAGE PICKUP METHOD TO SET IMAGE CAPTURING CONDITION

BACKGROUND OF THE INVENTION

1. Field of the Invention

The present invention relates to a technology used to set an image capturing condition under which an image pickup device performs automatic image capturing such as self-timer image capturing.

2. Description of the Related Art

In the case where the self-timer image capturing is performed, image capturing can be automatically performed after an elapse of an arbitrary number of seconds. Therefore, when a photographer enters into an angle of view before the arbitrary number of seconds elapse after making settings on the self-timer image capturing in a digital camera, the image of the photographer is also shown on a photograph.

In recent years, digital cameras having a face detection function have been available. The above-described digital camera allows for the detection of an image of a face (herein referred to as "a face image" shown in the angle of view and performing autofocus (AF) and/or autoexposure (AE) for the detected face image.

An image capturing method achieved through a combination of self-timer image capturing and face detection function is also available. According to a method disclosed in Japanese Patent Laid-Open No. 2006-301172, AF is not performed before a pre-set time is measured through a self timer. However, AF is performed for a face image detected through face detection after an image capturing instruction component is operated and time measurement is finished.

In the case where known self-timer image capturing is performed so that AF is performed at a predetermined position and a subject comes into focus and is fixed before the self-timer time measurement is performed, the subject falls out of focus when the composition is changed during the self-timer time measurement. Further, it is difficult to obtain focusing for a photographer who enters into the angle of view during the self-timer time measurement.

Further, if the photographer goes out of an area where the photographer can see a view finder after operating the image-capturing instruction component when performing the automatic image capturing through the face detection, as disclosed in Japanese Patent Laid-Open No. 2006-301172, it becomes difficult for the photographer to understand for which face image focusing should be obtained to perform image capturing. Therefore, it has been difficult for the photographer to confirm for which face image focusing is obtained before the photographer sees a picked up image.

SUMMARY OF THE INVENTION

In a camera according to an embodiment of the present invention, at least one subject is detected before an instruction to perform automatic image capturing is issued, and it is confirmed for which, at least, one subject an image capturing condition should be set. Further, if no subject is detected, a subject for which the image-capturing condition should be set is determined after the instruction to perform the automatic image capturing is issued, and the image-capturing condition is set.

An image pickup device according to an embodiment of the present invention includes an image pickup unit, a subject detecting unit configured to detect a predetermined subject from an image picked up through the image pickup unit, a determining unit configured to determine whether or not a result of the detection satisfies a predetermined condition, a determination unit configured to determine a subject for which an image capturing condition should be set before an image capturing instruction is accepted when a result of the determination made by the determining unit is determined to be true, an accepting unit configured to accept the image capturing instruction, a setting unit configured to set the image capturing condition based on the determined subject when a result of the determination made by the determining unit is true and set the image capturing condition based on a result of the detection performed by the subject detecting unit after the image capturing instruction is accepted by the accepting unit when the result of the determination made by the determining unit is false, and an actual image capturing unit configured to control the image pickup unit so that actual image capturing is performed when a predetermined requirement is satisfied after the image capturing instruction is accepted under the image capturing condition set through the setting unit.

According to another embodiment of the present invention, a method of controlling an image pickup device including an image pickup unit is provided, where the method includes the steps of detecting a predetermined subject from an image picked up through the image pickup unit, determining whether or not a result of the detection satisfies a predetermined condition, determining a subject for which an image capturing condition should be set before an image capturing instruction is accepted when it is determined that a result of the determination made at the determining step is true, accepting the image capturing instruction, setting the image capturing condition based on the determined subject when a result of the determination made at the determining step is true and setting the image capturing condition based on a result of the detection performed at the subject detecting step after the image capturing instruction is accepted at the accepting step when the result of the determination made at the determining step is false, and controlling the image pickup unit so that actual image capturing is performed when a predetermined requirement is satisfied after the image capturing instruction is accepted under the image capturing condition set at the setting step.

When at least one subject is detected before an instruction to perform automatic image capturing is issued, an image pickup device according to an embodiment of the present invention allows for confirming for which of the at least one subject the image capturing condition should be set before the automatic image capturing instruction is issued. Further, if no subject is detected before the instruction to perform the automatic image capturing is issued, the image capturing condition is set based on a subject detected just before image capturing is performed after the automatic image capturing instruction is issued so that the automatic image capturing can be performed.

This summary of the invention does not necessarily describe all necessary features so that the invention may also be a sub-combination of these described features. Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings illustrate exemplary embodiments of the present invention and, together with the description, serve to explain the principles of the present invention.

DESCRIPTION OF THE EMBODIMENTS

Exemplary embodiments of the present invention will be described in detail below with reference to the accompanying drawings.

It is to be noted that each of the following exemplary embodiments is merely one example for implementing the present invention and can be appropriately modified or changed depending on individual constructions and various conditions of devices and/or apparatuses to which the present invention is applied.

Hereinafter, embodiments of the present invention will be described with reference to the accompanying drawings.

Figure 1A:
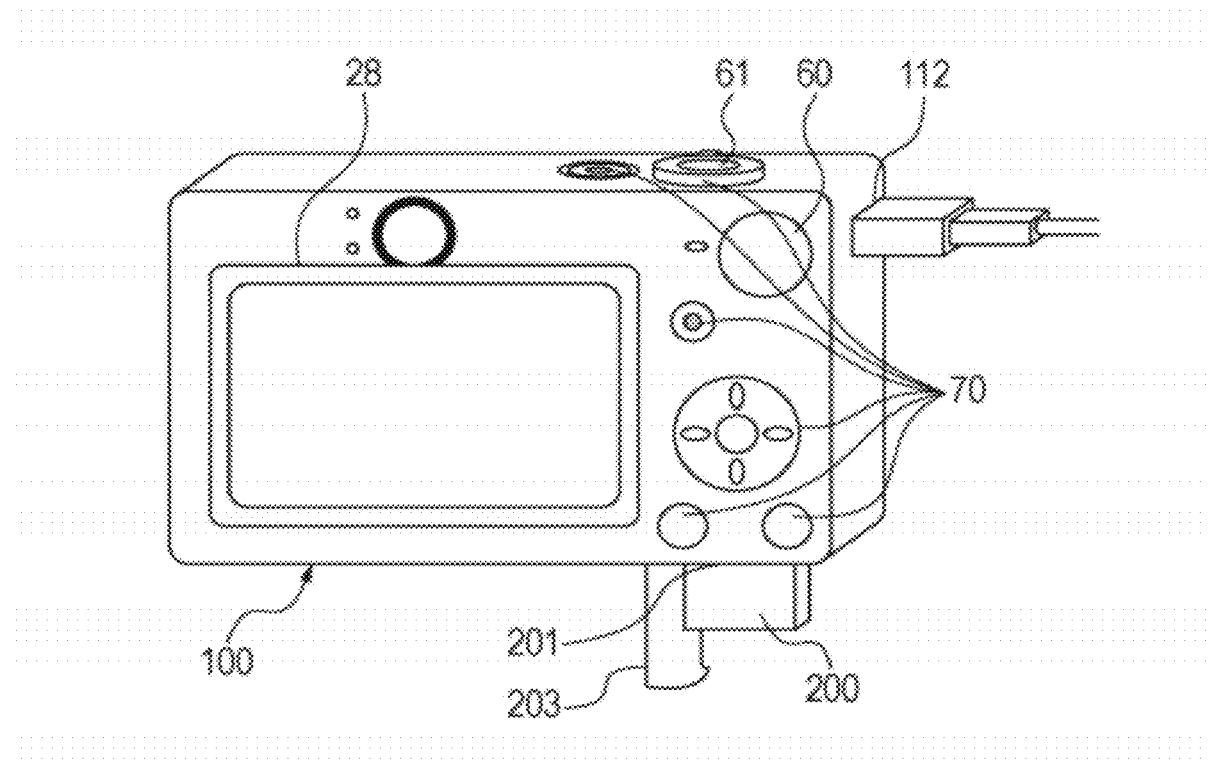
FIG. 1A is an external view of a digital camera according to an embodiment of the present invention.

FIG. 1A shows the external view of a digital camera used as an image-pickup device according to an embodiment of the present invention. An image display unit 28 is a display unit configured to display an image and/or various types of information items. A shutter button 61 is an operation member provided to issue an image capturing instruction. A mode dial 60 is an operation unit configured to switch between various modes. A connector 112 is provided to connect a connection cable to a digital camera 100. An operation unit 70 is configured to accept various operations performed by the user, where the operation unit 70 is provided with operation components including various types of switches, buttons, a touch panel, and so forth. A recording medium 200 includes a memory card, a hard disk, and so forth. A recording medium slot 201 is configured to house a recording medium 200. The recording medium 200 housed in the recording medium slot 201 can communicate with the digital camera 100. A lid 203 is provided to cover the recording medium slot 201.

Figure 1B:
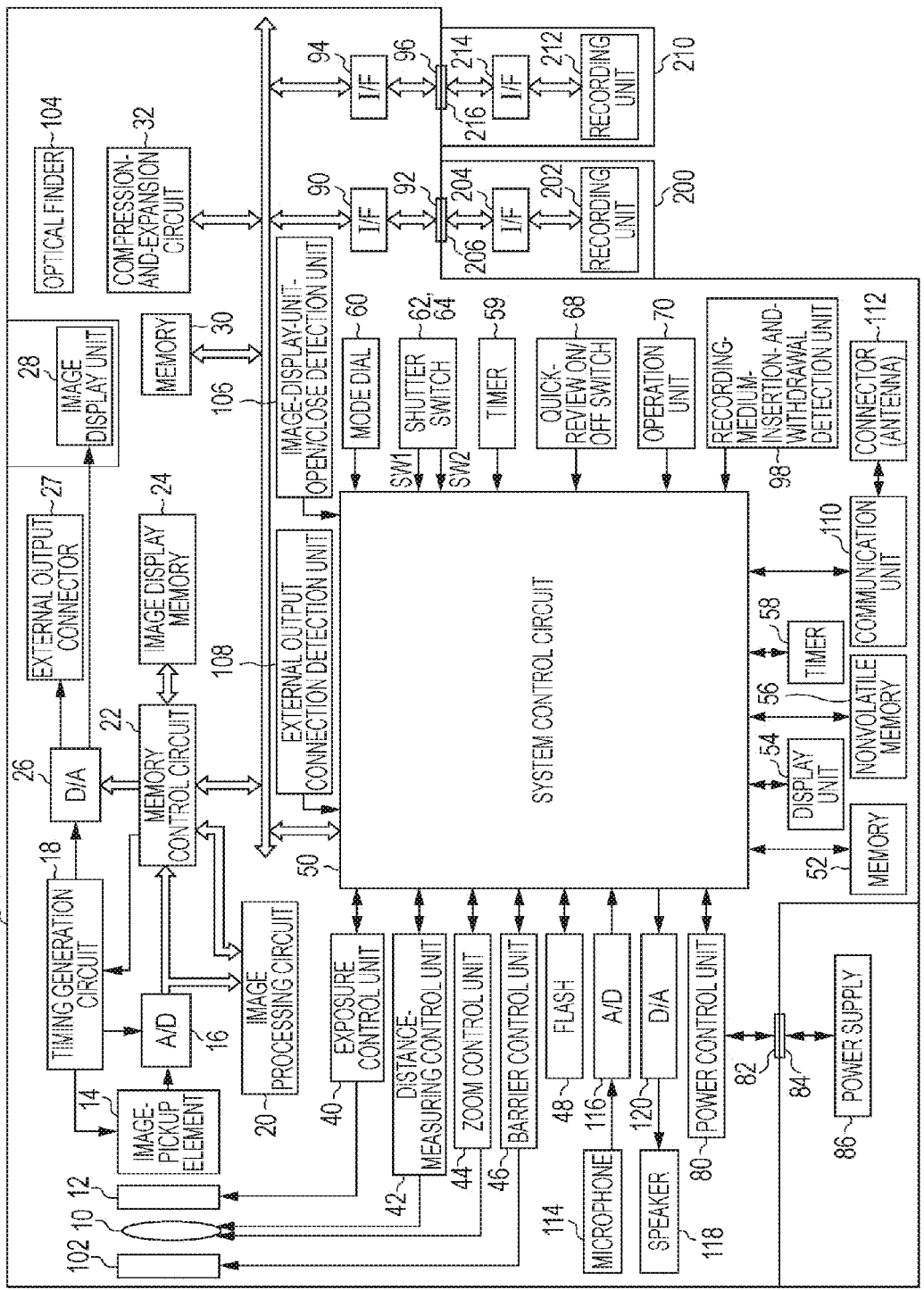
FIG. 1B is the configuration block diagram of a digital camera according to an embodiment of the present invention.

FIG. 1B is an exemplary configuration block diagram of the digital camera 100.

The digital camera 100 includes an imaging lens 10, a shutter 12 having an aperture function, an image-pickup element 14 configured to convert an optical image into an electric signal, and an analog-to-digital (A/D) converter 16 configured to convert an analog signal externally transmitted from the image-pickup element 14 into a digital signal.

The digital camera 100 further includes a timing generation circuit 18 configured to supply a clock signal and/or a control signal to the image-pickup element 14, the A/D converter 16, and an digital-to-analog (D/A) converter 26 under the control of a memory control circuit 22 and a system control circuit 50.

The digital camera 100 further includes an image processing circuit 20 configured to perform predetermined image interpolation processing and/or color conversion processing for data transmitted from the A/D converter 16 and/or the memory control circuit 22.

The image processing circuit 20 performs predetermined calculation processing based on image data obtained through image capturing. A system control circuit 50 performs control based on the calculation result obtained through the calculation processing so that AF processing, AE processing, and flash exposure (FE) processing, that is, pre-flash processing are performed.

Further, in the image processing circuit 20, predetermined calculation processing is performed based on image data obtained through image capturing, and through-the-lens (TTL) auto-white-balance (AWB) processing is performed based on the result of the calculation processing.

The memory control circuit 22 controls the A/D converter 16, the timing generation circuit 18, the image processing circuit 20, an image display memory 24, the D/A converter 26, a memory 30, and a compression-and-expansion circuit 32.

Data transmitted from the A/D converter 16 is written into the image display memory 24 and/or the memory 30 via the image processing circuit 20 and the memory control circuit 22. Otherwise, the above-described data is directly written into the image display memory 24 and/or the memory 30 via the memory control circuit 22.

An external output connector 27 is provided to externally transmit data transmitted from the D/A converter 26 to an external monitor. When a connector is inserted into the external output connector 27, an external output connection detection unit 108 notifies the system control circuit 50 about the external output state.

An image display unit 28 includes a thin film transistor (TFT) liquid crystal display (LCD), etc. Image data-for-display written into the image display memory 24 is displayed through the image display unit 28 via the D/A converter 26.

An electronic-finder function can be achieved by sequentially displaying picked-up image data items through the image display unit 28.

Further, the image display unit 28 can arbitrarily turn on and/or off the display based on an instruction transmitted from the system control circuit 50. When the display is turned off, the power consumption of the digital camera 100 can be significantly reduced.

Further, the image display unit 28 may be linked to the main body of the digital camera 100 by using a rotational hinge part. Further, the orientation and the angle of the image display unit 28 may be arbitrarily set and the electronic finder function, a reproduction-and-display function, and various display functions may be used. In that case, the image display unit 28 may be housed in the digital camera 100 so that the display part of the image display unit 28 faces the digital camera 100. Consequently, it becomes possible to detect the housing state through an image-display-unit open/close detection unit 106 and stop the display operation of the image display unit 28.

The memory 30 is configured to store data of a still image and/or video obtained through shooting and provided with a capacity sufficient enough to store data of a predetermined number of still images and/or video of a predetermined time length.

Subsequently, in the case where a continuous image capturing operation is performed to obtain a plurality of still images in a row and/or panorama shooting is performed, data of a large number of images can be written into the memory 30 with high speed.

Further, the memory 30 may be used as the work area of the system control circuit 50. The memory 30 may further be used as a write buffer of the recording medium 200 and/or a recording medium 210.

The compression-and-expansion circuit 32 is configured to compress and/or expand image data through adaptive discrete cosine transform (ADCT) or the like. Namely, the compression-and-expansion circuit 32 reads the image data stored in the memory 30, performs compression processing and/or expansion processing for the read image data, and writes the compressed and/or expanded image data into the memory 30.

An exposure control unit 40 is configured to control the shutter 12 having an aperture function. The exposure control unit 40 has a flash light control function by operating in collaboration with a flash 48.

A distance-measuring control unit 42 is configured to control focusing obtained through an imaging lens 10. A zoom control unit 44 is configured to control zooming performed by the imaging lens 10, and a barrier control unit 46 is configured to control the operation of a protection member 102 provided as a barrier.

The flash 48 also has the function of throwing AF auxiliary light and the flash light control function.

The exposure control unit 40 and the distance-measuring control unit 42 are controlled under the TTL system. The image data obtained through the image capturing is calculated by the image processing circuit 20, and the system control circuit 50 controls the exposure control unit 40 and the distance-measuring control unit 42 based on the calculation result.

The system control circuit 50 controls the entire digital camera 100. The system control circuit 50 performs processing according to each of the following embodiments of the present invention by executing a program stored in a nonvolatile memory 56.

A memory 52 is used to expand data of a constant, a variable, the program read from the nonvolatile memory 56, and so forth, the data being used by the system control circuit 50 performing operations.

A display unit 54 includes a liquid crystal display apparatus, a speaker, and so forth, so as to display the operation state, a message, and so forth as text data, image data, sound data, etc. based on the program executed in the system control circuit 50. The display unit 54 including, for example, a combination of a liquid crystal display (LCD), a light-emitting diode (LED), a sound-generating element, etc., is provided in at least one position near the operation unit 70 of the digital camera 100 so as to be visually recognized by the user with facility. Further, part of the functions of the display unit 54 is provided in the optical finder 104.

Of data displayed by the display unit 54, data of the aperture value, the exposure correction, the flash, macro shooting, the buzzer setting, the remaining battery life, an error, the insertion and withdrawal state of the recording mediums 200 and 210, etc. is displayed on the LCD etc.

Further, of the data displayed by the display unit 54, data of focusing, a hand-shake warning, the flash charging, the shutter speed, the aperture value, the exposure correction, etc. is displayed in the optical finder 104.

The nonvolatile memory 56 is electrically erasable and recordable, and provided as, for example, an electrically erasable and programmable read only memory (EEPROM). The nonvolatile memory 56 stores data of a constant, a program, etc., the data being used by the system control circuit 50 performing operations. The above-described program is provided to execute processing procedures shown in various types of flowcharts described in the following embodiments of the present invention.

A timer 58 is used to measure the data recording speed of the recording medium 200 and/or the recording medium 210, and/or the data rate of data for acquisition.

A timer 59 is used to count the number of seconds determined at the self-timer image capturing time.

The mode dial 60, a shutter switch SW1 (62), a shutter switch SW2 (64), a quick review ON/OFF switch 68, and an operation unit 70 are operation units provided to transmit instructions to perform various types of operations to the system control circuit 50. The operation units include at least one combination of a switch, a dial, a touch panel, a pointing device used to point a target through the sight line detection, a sound recognition device, etc.

The above-described operation units will be described in detail.

The mode dial 60 allows for switching between turning the power off and function modes for setting, where the function modes include automatic image capturing mode, image capturing mode (including panorama shooting mode and video shooting mode), reproducing mode, multi-screen reproducing-and-deleting mode, PC connection mode, and so forth.

The shutter switch SW1 (62) is turned on while the shutter button 61 is operated, so as to instruct to start operations including AF processing, AE processing, AWB processing, FE processing, that is, pre-flash processing, and so forth.

The shutter switch SW2 (64) is turned on after the operation of the shutter button 61 is finished, so as to instruct to start the operation of the AE processing. Consequently, a signal read from the image-pickup element 14 is transmitted through the A/D converter 16 and the memory control circuit 22, and written into the memory 30 as image data. Namely, the shutter button 61 is an image-capturing instruction component and an image capturing instruction is accepted when the shutter switch SW2 (64) is turned on. At the same time, an instruction to start a series of operations is issued, where the operations include development processing achieved through calculations performed in the image processing circuit 20 and/or the memory control circuit 22 and recording processing including reading the image data from the memory 30, compressing the image data through the compression-and-expansion circuit 32, and writing the image data onto the recording medium 200 and/or the recording medium 210. When shooting video, an instruction to start or stop the video shooting is issued.

The quick review ON/OFF switch 68 sets a quick review function so as to automatically reproduce image data captured immediately after the image capturing is performed. Particularly, the function of setting the quick review function when the image display unit 28 is turned off is provided in the above-described embodiment.

The operation unit 70 includes various types of buttons, the touch panel, and so forth. More specifically, the operation unit 70 includes a menu button, a set button, a macro button, a multi-screen reproducing-and-page break button, a flash setting button, a single shooting/continuous shooting/self-timer change button, a menu moving + (plus) button, a menu moving − (minus) button, a reproduced-image moving + (plus) button, a reproduced-image moving − (minus) button, a button provided to select the quality of an image obtained through image capturing, an exposure correction button, a date-and-time setting button, a selection-and-switching button provided to select and switch between the functions, a determining button provided to set the determination and the execution of the functions, a display button provided to turn on and/or off the image display unit 28, a quick review ON/OFF switch provided to set a quick-review function so as to automatically reproduce image data obtained through image capturing immediately after the image capturing is performed, a zoom operation unit provided to adjust zoom and a wide angle at the image capturing time, adjust magnification and/or reduction at the reproducing time, and switch between single-screen display and multi-screen display, and a compression mode switch provided to select the compression rate for Joint Photographic Expert Group (JPEG) compression and/or select charge-coupled-device (CCD) RAW mode where a signal transmitted from the image-pickup element is digitized without being processed and recorded onto a recording medium.

A power control unit 80 detects whether or not a battery is mounted, the battery type, and the remaining battery life. Further, the power control unit 80 supplies an appropriate voltage to each of components including the recording mediums over an appropriate time period based on the detection result and instructions of the system control circuit 50.

Connectors 82 and 84, and a power unit 86 are provided. The power unit 86 includes a primary battery including an alkaline cell, a lithium cell, and so forth, a secondary battery including a NiCd cell, a NiMH cell, an Li cell, and so forth, an alternating current (AC) adapter, etc.

Each of interfaces 90 and 94 is provided between the digital camera 100 and a recording medium including a memory card, a hard disk, and so forth. Each of connectors 92 and 96 is provided to connect the digital camera 100 to the recording medium including the memory card, the hard disk, and so forth. A recording medium insertion-and-withdrawal detection unit 98 is provided to detect whether the recording medium 200 and/or the recording medium 210 is inserted into the connector 92 and/or the connector 96.

According to the above-described embodiment, two systems of interfaces and connectors into which the recording mediums are inserted are provided. As a matter of course, at least one of each of the above-described interfaces and connectors may be provided. Further, a combination of an interface and a connector that are manufactured under different standards may be provided.

The interface and the connector may be compliant with the standard of a Personal Computer Memory Card International Association (PCMCIA) card, a CompactFlash (CF (Registered Trademark)) card, and so forth.

Further, inserting various types of communication cards into the interfaces 90 and 94, and the connectors 92 and 96 allows for transferring image data and/or management information attached to the image data between the digital camera 100 and different devices.

The protection member 102 is provided as a barrier covering the image-pickup unit including the imaging lens 10 of the digital camera 100 so that the image-pickup unit is prevented from being soiled and/or damaged.

It becomes possible to perform image capturing only by using the optical finder 104 without using the electronic finder function of the image display unit 28. Further, the optical finder 104 includes part of the functions of the display unit 54. For example, the optical finder 104 includes the functions of performing the focusing display, the hand-shake warning display, the flash charging display, the shutter speed display, the aperture value display, the exposure correction display, and so forth.

The image-display-unit open/close detection unit 106 can detect whether or not the image display unit 28 is in the housing state where the display part of the image display unit 28 faces the digital camera 100.

If it is detected that the image display unit 28 is in the above-described housing state, the display operation of the image display unit 28 can be stopped so as to reduce unnecessary power consumption.

The external output connection detection unit 108 can detect whether or not an external monitor is connected to the external output connector 27. If it is detected that the external monitor is connected to the external output connector 27, the external monitor can be used in place of the image display unit 28 as a display device.

A communication unit 110 has the function of achieving various types of communications performed under the Recommended Standard (RS) 232C, the Universal Serial Bus (USB) standard, the Institute of Electrical and Electronics Engineers, Inc. (IEEE) 1394 standard, the P1284 standard, and the Small Computer System Interface (SCSI) standard, communications performed by using a modem and a local-area network (LAN), wireless communications, and so forth.

The connector 112 is provided to connect the digital camera 100 to a different device through the communication unit 110. If wireless communications are performed, the connector 112 is provided as an antenna.

A microphone 114 is provided as a sound-data acquisition unit. An A/D converter 116 performs A/D conversion for sound data obtained through the microphone 114 so that the system control circuit 50 can acquire the sound data.

A speaker 118 is provided as a sound-data reproducing unit. A D/A converter 120 is provided to reproduce digital sound data transmitted from the system control circuit 50 through the speaker 118.

The recording medium 200 includes a memory card, a hard disk, and so forth.

The recording medium 200 includes a recording unit 202 including a semiconductor memory, a magnetic disk, and so forth, an interface 204 to the digital camera 100, and a connector 206 used to connect to the digital camera 100.

When the recording medium 200 is a PC card manufactured under the PCMCIA standard, a CompactFlash card, and so forth, the recording medium 200 may include an information storage circuit storing data of performance capabilities.

The recording medium 210 includes a memory card, a hard disk, and so forth.

The recording medium 210 includes a recording unit 212 including a semiconductor memory, a magnetic disk, and so forth, an interface 214 to the digital camera 100, and a connector 216 used to connect to the digital camera 100.

When the recording medium 210 is the PC card manufactured under the PCMCIA standard, the CompactFlash card, and so forth, the recording medium 210 may include the information storage circuit storing data of performance capabilities.

The above-described digital camera 100 allows for performing image capturing by using single-center-point AF and/or face detection AF. The single-center-point AF denotes performing AF for a single point shown at the center of the photographic image plane. The face detection AF denotes performing AF for a face image produced on the photographic image plane, the face image being detected through a face detection function.

The face detection function will be described. The system control circuit 50 transmits image data for the face detection to the image processing circuit 20. Under the control of the system control circuit 50, the image processing circuit 20 subjects the image data to a horizontal band-pass filter, and subjects the processed image data to a vertical band-pass filter. Consequently, an edge component is detected from the image data through the above-described horizontal and vertical band-pass filters.

After that, the system control circuit 50 performs pattern matching for the detected edge component, and extracts data of a group of candidates for eyes, a nose, a mouth, and an ear. Then, the system control circuit 50 determines candidates satisfying predetermined conditions (e.g., the distance between the two eyes, the inclination, and so forth) to be a pair of eyes. Then, the system control circuit 50 narrows down data of the pair of eyes only, as a group of candidates for the eyes. Then, the system control circuit 50 associates the above-described eye-candidate group with other parts (the nose, the mouth, the ear) that are included in the face image corresponding to the eye-candidate group, and subjects the eye-candidate group and the other parts to a predetermined non-face condition filter. Consequently, the face image is detected. The system control circuit 50 externally transmits the above-described face information based on the face detection result, and terminates the processing. At that time, the face information which is the feature value indicating the number of face images or the like is stored in the memory 52.

As described above, it becomes possible to analyze through-displayed image data and extract information about the feature value of the image data so that the subject information can be detected. In the above-described embodiment, the face information was exemplarily described as the subject information. However, the subject information includes other various information indicating the eye detection, etc.

Further, at the same time as when the face detection AF is performed, face AE and face FE can be performed. The face AE denotes optimizing the exposure of the entire screen image based on the brightness of the detected face image. The face FE denotes performing the light control so as to appropriately adjust the light quantity of a flash for the detected face image.

In addition to the above-described normal image capturing, self-timer image capturing, which is a kind of automatic image capturing, can be performed. After the shutter switch SW2 (64) is pressed, image capturing is automatically performed after a predetermined number of seconds that had already been set by the user are counted. When the self-timer image capturing is performed, not only the number of seconds but also the number of at least one photograph that can be obtained through a single operation of the shutter switch SW2 (64) can be arbitrarily determined. When the operation unit 70 is operated, the digital camera 100 enters self-timer image capturing mode so that self-timer image capturing illustrated in flowcharts of FIGS. 2, 3, and 4 that will be described later is performed based on the settings.

Operations performed in embodiments of the present invention will be described with reference to FIGS. 2, 3, 4, 5, 6, 7, and 8.

First Embodiment

In a first embodiment of the present invention, the time when the AF is performed is automatically changed based on whether or not a face image is shown on the photographic image plane before the self-timer time measurement is started.

Figure 2:
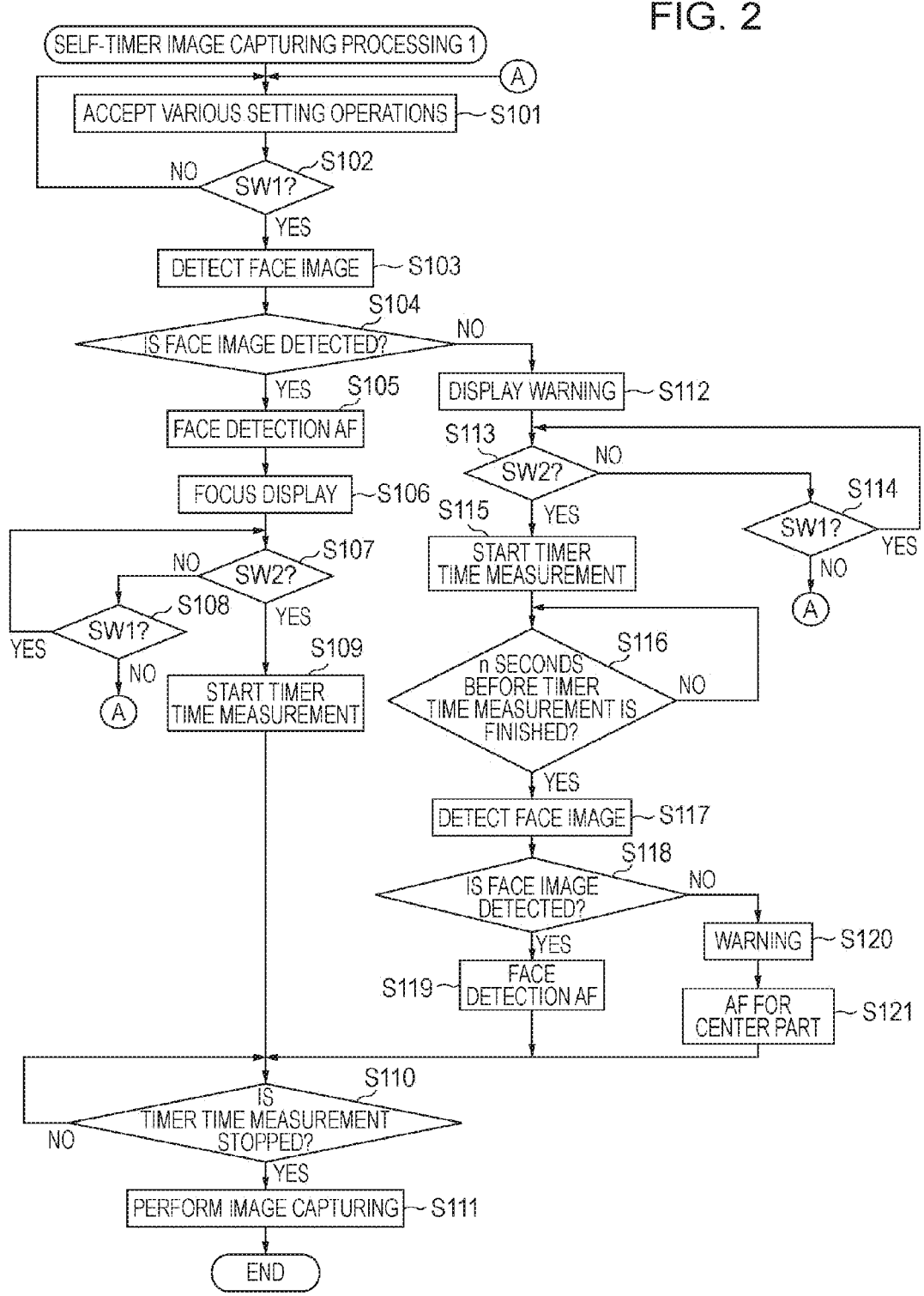
FIG. 2 is a flowchart showing self-timer image capturing 1 performed according to a first embodiment of the present invention.

FIG. 2 is a flowchart showing self-timer image capturing processing 1 performed to automatically change the time when the AF is performed based on whether or not a face image is shown on the photographic image plane before the self-timer time measurement is started. Each of processing procedures included in the self-timer image capturing processing 1 is achieved by the system control circuit 50 expanding the program stored in the nonvolatile memory 56 or the like in the memory 52 and executing the program.

The operation unit 70 is operated so that the digital camera 100 enters the self-timer image capturing mode. After that, the through display is performed to display data of an image picked up through the image-pickup element 14 on the image display unit 28, and data of settings on zooming, ISO Speed Ratings, the record size of a picked up image, and so forth is accepted at step S101. Then, it is determined whether or not the shutter switch SW1 (62) is operated at step S102. If it is determined that the shutter switch SW1 (62) is operated, face-detection processing is performed through the above-described face detection function at step S103.

Then, at step S104, it is determined whether or not a face image is shown on the photographic image plane based on the result of the face detection performed at step S103. If it is determined that the face image is shown, the processing advances to step S105. Otherwise, the processing advances to step S112.

Figure 5:
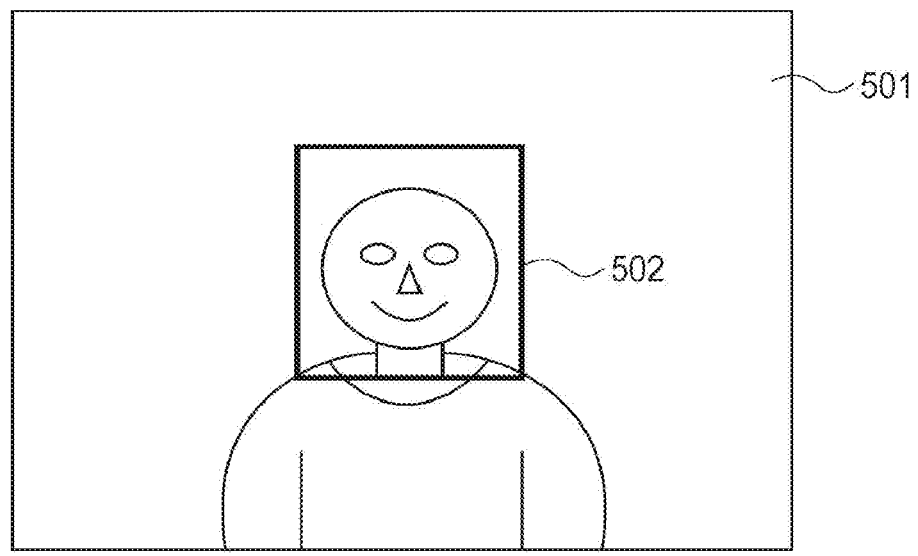
FIG. 5 shows an exemplary display screen image showing a focusing display image produced before an image capturing instruction is issued after the face detection AF is performed.

At step S105, the face detection AF is performed so that the detected face image comes into focus. Then, at step S106, a display image generated to confirm the focusing is shown on the image display unit 28. FIG. 5 shows an exemplary focusing display image shown on the image display unit 28. A through image 501 is an image that is displayed through the through display performed to display data on an image picked up through the image-pickup element 14. Further, the through image 501 shows a picture obtained at the current image-capturing angle of view in approximately real time. If an image of the face of a person is detected from the through image 501, a face frame 502 is displayed in, for example, white for the detected face image. Then, the face detection AF is performed at step S105 shown in FIG. 2. When the face image successfully comes into focus, the color of the frame of the above-described face image is changed to, for example, green at the same time as when the speaker 118 produces a notification beeping sound. At that time, the LED and/or the AF auxiliary light provided on the front face of the digital camera 100 may illuminate so that the user is notified of the focusing. Consequently, a photographer can confirm for which of face images produced on the photographic image plane focusing should be obtained for the self-timer image capturing performed from then on.

Returning to FIG. 2, it is determined whether or not the shutter switch SW2 (64) is operated at step S107. If it is determined that the shutter switch SW2 (64) is not operated, the processing advances to step S108 so as to determine whether or not the shutter switch SW1 (62) remains turned on. If the shutter switch SW1 (62) remains turned on, the processing returns to step S107 and is held until the shutter switch SW2 (64) is operated. If the shutter switch SW1 (62) is turned off, the processing returns to step S101 so that the self-timer image capturing processing 1 is performed again. If it is determined that the shutter switch SW2 (64) is operated, the processing advances to step S109.

At step S109, the self-timer time measurement is started. Then, at step S110, the processing is held until the self-timer time measurement is finished. After the self-timer time measurement is finished, the processing advances to step S111 where image capturing processing (actual image capturing) is performed based on the result of the face detection AF performed at step S105, and the self-timer image capturing processing 1 is finished.

Figure 6:
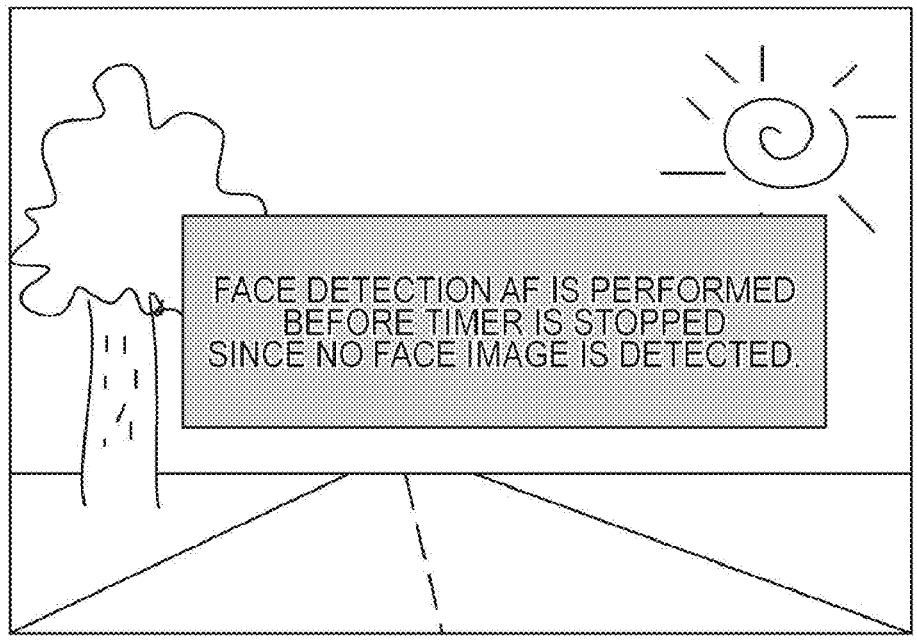
FIG. 6 shows an exemplary display screen image produced to warn a photographer that AF is performed before self-timer time measurement is finished.

On the other hand, if it is determined that no face image is shown at step S104, the processing advances to step S112 where warning display is performed to notify the photographer that the face detection is performed before the self-timer time measurement is finished because no face image was detected. FIG. 6 illustrates an exemplary warning display image produced at step S112. As no face image is detected from the through image, the AF is not performed accordingly before an image-capturing instruction is issued by operating the shutter switch SW2 (64). FIG. 6 shows a display image indicating that the AF is performed after the self-timer time measurement is started and before the self-timer time measurement is finished. The above-described warning may be achieved by the AF auxiliary light and/or a sound emitted from the speaker 118. Accordingly, the photographer understands that the face detection AF is performed for his/her face when he/she moves into the image-capturing angle of view after issuing the image-capturing instruction and starting the self-timer time measurement.

Since processing procedures performed at steps S113 and S114 are the same processing procedures as those performed at steps S107 and S108, the descriptions thereof will be omitted. After the shutter switch SW2 (64) is operated at step S113, the processing advances to step S115.

The self-timer time measurement is started at step S115. Then, at step S116, the processing is held until n seconds before the self-timer time measurement is finished. The above-described n seconds are set as a time period long enough to perform processing procedures at the following steps in before image capturing is started. Otherwise, the above-described n seconds are set so that the photographer can move into the image-capturing angle of view without haste before the n seconds have elapsed since the self-timer time measurement was started at step S115. For example, when the number of seconds set for the self timer is ten and the n seconds are two seconds or around, eight seconds are left before the photographer moves after the time measurement is started and the n seconds are left. Therefore, the photographer can move into the area corresponding to the image plane without haste. At the n seconds to when the self-timer time measurement is finished, the processing advances to step S117.

At step S117, the face detection processing is performed by using the above-described face detection function. Here, a predetermined time period (the set number of seconds–the n seconds) has elapsed since the shutter switch SW2 (64) was operated. Therefore, the face image of the photographer can be detected if the photographer had moved into the image-capturing angle of view.

Then, at step S118, it is determined whether or not the face image is shown on the photographic image plane based on the result of the face image detection performed at step S117. If it is determined that the face image is shown, the processing advances to step S119. Otherwise, the processing advances to step S120.

At step S119, the face detection AF is performed so that the detected face image comes into focus. In the case where the detected face image corresponds to the face of the photographer, the face detection AF is performed for the photographer himself. If the face detection AF is successfully performed so that the face image comes into focus, the focusing display may be performed as is the case with step S106. However, in contrast to step S106, the photographer may be too far from the digital camera 100 to see the image display unit 28. Therefore, the volume of the notification sound emitted from the speaker 118 may be increased to a level higher than that attained at step S106. Otherwise, the notification sound may be changed so that the photographer at a distance from the digital camera 100 can perceive that the focusing is obtained. Further, the LED and/or the AF auxiliary light provided on the front face of the digital camera 100 may illuminate differently from what it does at step S106 so that the photographer at a distance from the digital camera 100 can perceive that the focusing is obtained. Consequently, the photographer at a distance from the digital camera 100 can perceive that the face image of a person who moves into the image-capturing angle of view after the image-capturing instruction is issued at step S113 comes into focus.

After the face detection AF is finished, the processing advances to step S110 and is held until the self-timer time measurement is finished. After the self-timer time measurement is finished, the processing advances to step S111, the image capturing processing (actual image capturing) is performed based on the result of the face detection AF performed at step S119, and the self-timer image capturing processing 1 is finished.

At step S120, a warning is issued by using a display image and/or a sound to notify the photographer that the AF is performed for the center point of the photographic image plane because no face image was detected. Then, at step S121, the AF is performed for a single point shown at the center of the photographic image plane because no face image was detected. After the above-described AF is finished, the processing advances to step S110 and is held until the self-timer time measurement is finished. After the self-timer time measurement is finished, the processing advances to step S111, the image capturing processing (actual image capturing) is performed based on the result of the AF performed for the single center point at step S121, and the self-timer image capturing processing 1 is finished.

If it is determined that the face image is shown on the photographic image plane at step S104, the processing advances to step S105. However, it may be configured that a predetermined button included in the operation unit 70 is pressed so that the processing advances to step S112 instead of step S105. When the above-described button is provided, it becomes possible to avoid erroneously performing the AF for a face image which is a subject for which the photographer does not want to obtain focusing, and obtain focusing for the face image of a person who moves into the angle of view during the self-timer time measurement.

Further, at step S104, it may be determined whether or not at least one face image is detected from, for example, an area defined near the center of the photographic image plane. If the at least one face image is detected from the area, the processing advances to step S105. Otherwise, the processing advances to step S112. Consequently, if a face image detected from the perimeter part of the photographic image plane is a subject for which the photographer does not want to obtain focusing, it becomes possible to avoid erroneously performing the AF for the face image detected from the perimeter part before an instruction to perform the self-timer image capturing is issued. At step S104, it may be determined whether or not a different predetermined condition is satisfied so long as it is determined whether settings on the image capturing condition such as the AF should be made before or after the self-timer image capturing instruction is issued.

According to the above-described embodiment, it becomes possible to automatically determine whether or not a face image is shown on the photographic image plane before the self-timer time measurement is started and change the time when the AF is performed so that the AF is appropriately performed before or after the self-timer image capturing instruction is issued.

If it is determined that the face image is shown on the photographic image plane before the self-timer time measurement is started, it may be considered that a subject for which the photographer wants to perform the face detection AF had already been shown in the angle of view. In that case, therefore, the face detection AF is performed before the self-timer image capturing instruction is issued (before the time measurement is performed) and the photographer is notified of the result of the face detection AF. Consequently, the photographer can confirm for which of face images shown on the photographic image plane the AF should be performed before the self-timer image capturing instruction is issued (before the time measurement is performed).

If it is determined that no face image is shown on the photographic image plane before the self-timer time measurement is started, it may be considered that the subject for which the photographer wants to perform the face detection AF does not exist in the angle of view. In that case, therefore, the face detection is performed on the photographic image plane just before the self-timer time measurement is finished. If a face image is detected, the AF and image capturing is performed for the detected face image. Consequently, when the image of the photographer appears on the photographic image plane during the self-timer time measurement, the AF and image capturing can be performed for the photographer.

Second Embodiment

According to a second embodiment of the present invention, it is determined that a face image is shown on the photographic image plane before the self-timer time measurement is started, and information about the face image is changed during the self-timer time measurement. Hereinafter, the descriptions of the same components and/or processing as those described in the first embodiment will be omitted. The components and/or processing different from those described in the first embodiment will be described in detail.

Figure 3:
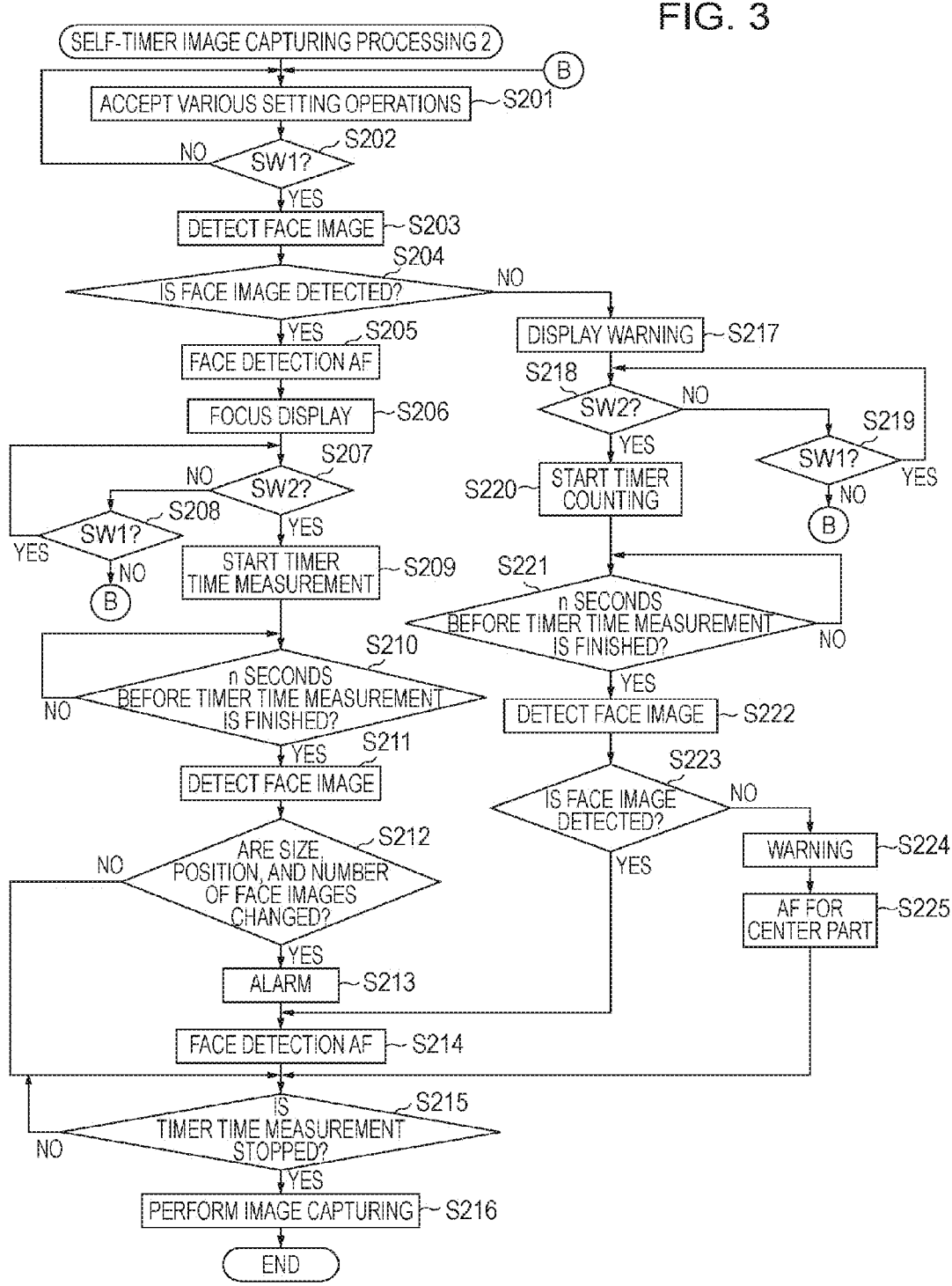
FIG. 3 is a flowchart showing self-timer image capturing 2 performed according to a second embodiment of the present invention.

FIG. 3 is a flowchart showing self-timer image capturing processing 2 performed when it is determined that at least one face image is shown on the photographic image plane before the self-timer time measurement is started, and the face image information is changed during the self-timer time measurement. Each of processing procedures included in the self-timer image capturing processing 2 is achieved by the system control circuit 50 expanding the program stored in the non-volatile memory 56 or the like in the memory 52 and executing the program.

Since processing procedures performed at steps S201, S202, S203, and S204 are the same processing procedures as those performed at steps S101 to S104 that are shown in FIG. 2, the descriptions thereof will be omitted. If it is determined that the face image is shown at step S204, the processing advances to step S205. Otherwise, the processing advances to step S217.

Since processing procedures performed at steps S205, S206, S207, S208, and S209 are the same processing procedures as those performed at steps S105 to S109 that are shown in FIG. 2, the descriptions thereof will be omitted.

At step S210, the processing is held until the n seconds before the self-timer time measurement is finished. The n seconds are the same as those described in the first embodiment. At the n seconds to when the self-timer time measurement is finished, the processing advances to step S211.

At step S211, the face detection processing is performed through the above-described face detection function. Here, a predetermined time period (the set number of seconds–the n seconds) has elapsed since the shutter switch SW2 (64) was operated. Therefore, the state of the photographic image plane may be different from that attained at step S203 where the face detection is performed. For example, the face image that had been detected at step S203 may have been moved, or the face image of a person (e.g., the photographer) who had not been seen in the image-capturing angle of view at step S203 may have been moved into the image-capturing angle of view so that the face image of the person is detected.

Then, at step S212, information about the face image detected at step S203 is compared to that about the face image detected at step S211, and it is determined whether the value of a change in the face image information obtained at step S211 is equivalent to or larger than a predetermined threshold value (the change determination). At step S212, the comparison is made in terms of the size, the position, and the number of the at least one face image based on the face information. Further, if the face image comparison is made in terms of the size and/or the position of the face image of a certain person, information about the face image is compared to the face image information of the same person. If it is determined that a change had occurred in the face information, the processing advances to step S213. Otherwise, the processing advances to step S215.

Figure 7:
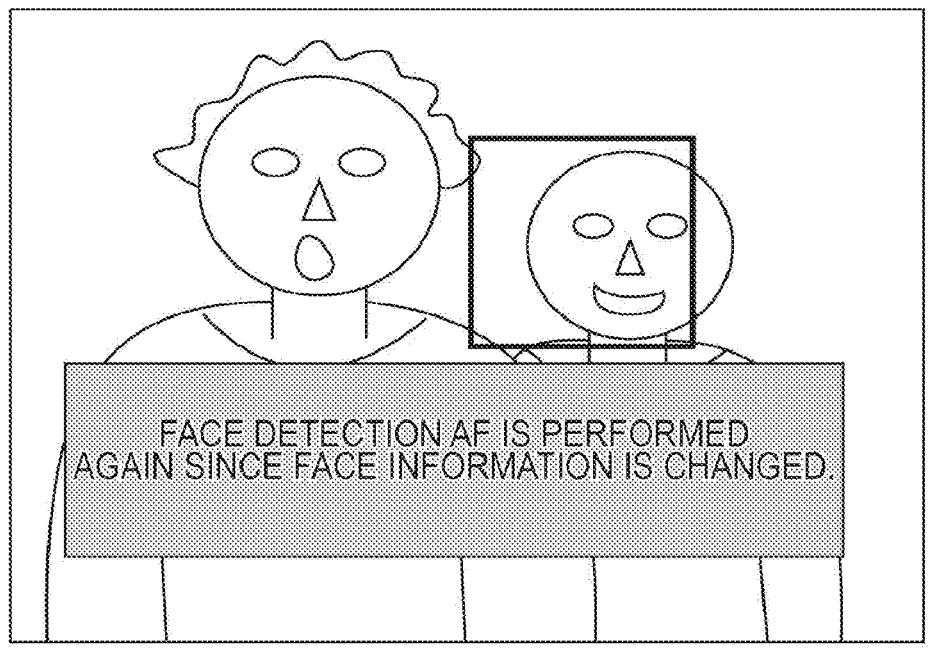
FIG. 7 shows an exemplary display screen image produced to warn the photographer that the AF is performed again.

At step S213, the AF is performed again and a warning is issued to notify the photographer that the focus adjustment attained through the AF performed at step S205 will be changed. After the AF is performed at step S213, a display image obtained as the result of the AF becomes different from that of the focusing display confirmed by the photographer at step S206 so that the obtained display image may be different from what the photographer intended. In that case, therefore, the warning is given to the photographer. FIG. 7 shows an exemplary warning display image produced on the image display unit 28 at step S213. FIG. 7 shows a through image and information indicating that the image capturing condition that had been used by then are changed by performing the face detection AF again, because the face information obtained through the face detection performed at step S203 is different from that obtained through the face detection performed at step S211. Further, considering a possibility that the photographer does not exist in the vicinity of the digital camera 100, the warning may be achieved through a notification sound emitted from the speaker 118, and/or the LED and/or the AF auxiliary light illuminating on the front face of the digital camera 100. Consequently, the photographer at a distance from the digital camera 100 can perceive that the face detection AF performed at step S205 before the image capturing instruction was issued is performed again, because the state of the photographic image plane is different from that obtained when the face detection was performed at step S203.

Next, the AF is performed again at step S214. At that time, the notification about the focusing may be performed so that the photographer at a distance from the digital camera 100 can easily perceive the focusing, as is the case with the face detection AF performed at step S119 shown in FIG. 2.

After the face detection AF is finished, the processing advances to step S215 and is held until the self-timer time measurement is finished. After the self-timer time measurement is finished, the processing advances to step S216 so that the image capturing processing (actual image capturing) is performed based on the result of the face detection AF performed at step S214, and the self-timer image capturing processing 2 is finished.

On the other hand, if it is determined that no face image is shown at step S204, the processing advances to step S217. Since processing procedures performed at steps S217, S218, S219, S220, S221, S222, S223, S224, and S225 are the same processing procedures as those performed at steps S112 to S121 that are shown in FIG. 2, the descriptions thereof will be omitted.

The face-information change determination made at step S212 according to the above-described embodiment may be made only for the image of a predetermined face determined to be the main face by the digital camera 100 (hereinafter referred to as the main face image). Accordingly, it becomes possible to avoid erroneously performing the face detection AF again for the face image of a third party who is not expected by the photographer when the face image of the third party moves into the image-capturing angle of view after the self-timer time measurement is performed.

In addition to the determination made at step S212, a stillness determination may be made to determine whether or not the position of the detected face image stands still, where it is determined that the detected face image stands still when the movement amount of the position of the detected face image does not exceed a predetermined moving amount. If it is determined that the face image does not stand still, the processing advances to step S213 so that a warning is issued and the stillness determination is made again. If it is determined that the face image stands still, the processing advances to step S214 so that the face detection AF is performed. If it is determined that the face image does not stand still, the duration of the self-timer time measurement may be increased. Consequently, it becomes possible to prevent the subject from being shaken at the image capturing time. The stillness determination may be made only for the main face image.

If at least one of the position, the size, the number of the at least one face image is changed during the self-timer time measurement in the above-described embodiment, the AF is performed again so that appropriate focusing is obtained for the face image. Since the warning is issued when the AF is performed again, the photographer at a distance from the digital camera 100 can perceive what kind of AF is performed.

Third Embodiment

According to a third embodiment of the present invention, a face image for which the AF should be performed is determined before the self-timer time measurement is performed in the case where at least one face image is shown on the photographic image plane before the self-timer time measurement is started, and the face detection AF is performed for a face image determined to be a face image for which the AF should be performed just before the self-timer time measurement is finished. Hereinafter, the descriptions of the same components and/or processing procedures as those described in the first embodiment will be omitted. The components and/or processing procedures different from those described in the first embodiment will be described in detail.

Figure 4:
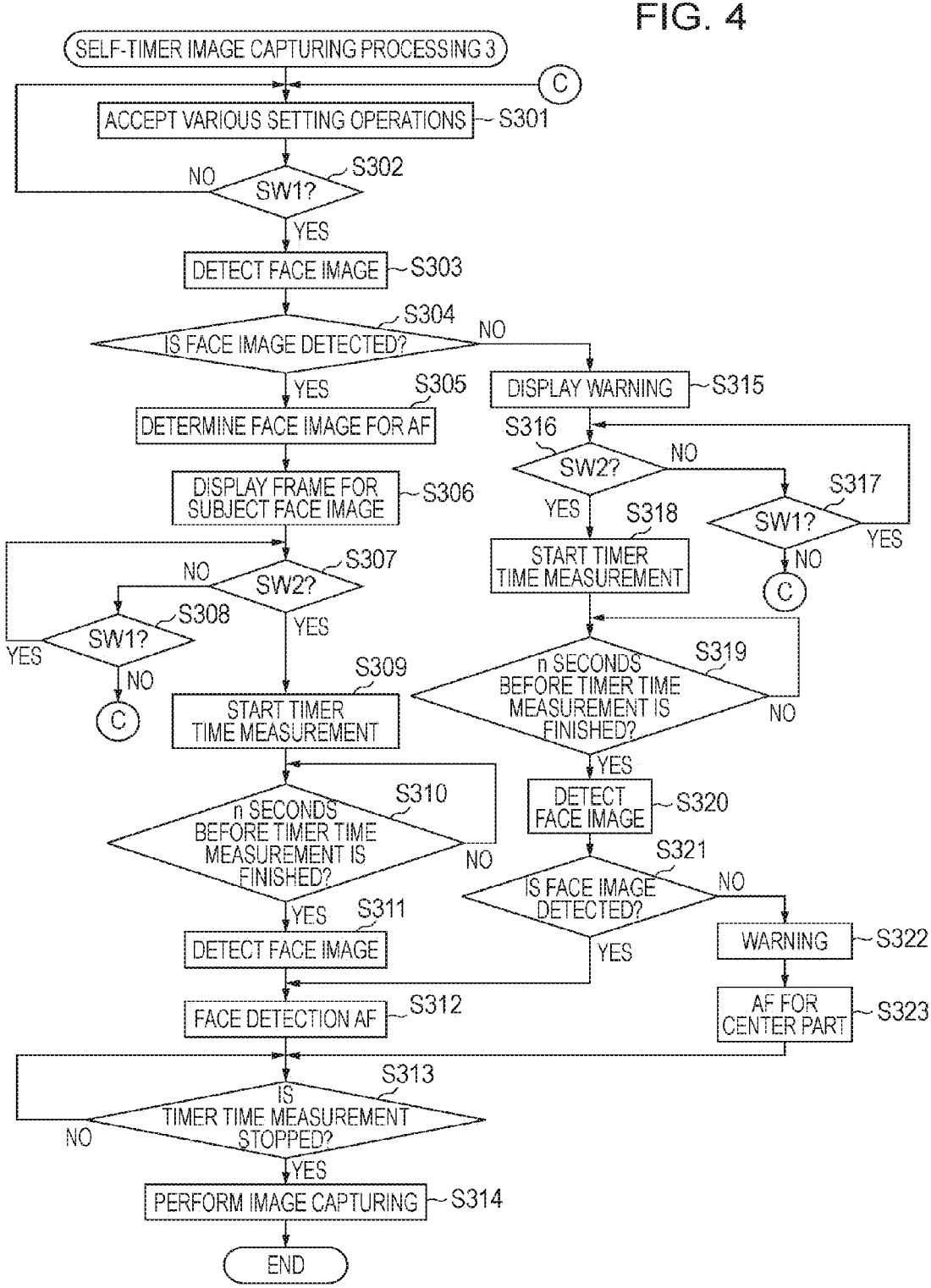
FIG. 4 is a flowchart showing self-timer image capturing 3 performed according to a third embodiment of the present invention.

FIG. 4 is a flowchart showing self-timer image capturing processing 3 performed when it is determined that at least one face image is shown on the photographic image plane before the self-timer time measurement is started, and the AF is performed just before the self-timer time measurement is finished. Each of processing procedures included in the self-timer image capturing processing 3 is achieved by the system control circuit 50 expanding the program stored in the nonvolatile memory 56 or the like in the memory 52 and executing the program.

Since processing procedures performed at steps S301, S302, S303, and S304 are the same processing procedures as those performed at steps S101 to S104 that are shown in FIG. 2, the descriptions thereof will be omitted. If it is determined that the face image is shown at step S304, the processing advances to step S305. Otherwise, the processing advances to step S315.

The face image for the AF is determined at step S305. If a plurality of face images is detected at step S303, the photographer can arbitrarily select the face image for the AF from among the detected face images through the operation unit 70. After the face image for the AF is determined, the processing advances to step S306.

Figure 8:
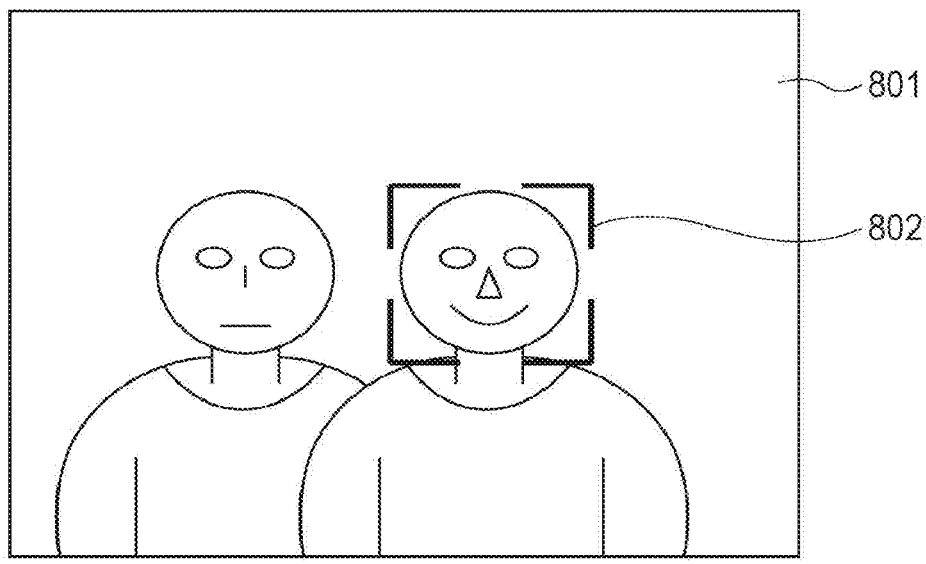
FIG. 8 shows an exemplary display screen image showing a target subject after the photographer specifies a face targeted for the AF.

At step S306, a display image indicating that the face image determined at step S305 is a subject for the AF is produced. FIG. 8 shows an exemplary display image of the subject for the AF, where the display image is shown on the image display unit 28. In FIG. 8, the face images of two people are captured and displayed as a through image 801. Both the faces of the two people are detected. Of the face images of the two people, the photographer can select the face image for which the photographer wants to obtain focusing at the image capturing time by operating the operation unit 70. If the photographer does not perform the selection operation, the digital camera 100 automatically selects the main face image based on the size, position, etc. of each of the face images and determines the selected main face image to be a face image for which the focusing should be obtained. After determining the face image for which the focusing should be obtained, a frame 802 is displayed in accordance with the determined face image. Since the AF was not yet performed by then, the frame 802 is displayed differently from the face frame 502 shown in FIG. 5, where the face frame 502 indicates that focusing is obtained for the face image shown in the face frame 502, so that the frame 802 can be discriminated from the frame 502. The above-described frame 802 is moved simultaneously as the same face image is moved until the AF is actually performed even though the face image is moved on the image plane in accordance with the movement of the subject. Consequently, the photographer can select and confirm for which face image the AF should be performed for image capturing during the self-timer image capturing which would be performed from then on.

Since processing procedures performed at steps S307 and S308 are the same processing procedures as those performed at steps S107 and S108 that are shown in FIG. 2, the descriptions thereof will be omitted. After the shutter switch SW2 (64) is operated at step S307, the processing advances to step S309.

The self-timer time measurement is started at step S309. Then, at step S310, the processing is held until the n seconds before the self-timer time measurement is finished. The n seconds are the same as those described in the first embodiment. At the n seconds to when the self-timer time measurement is finished, the processing advances to step S311.

At step S311, the face detection is performed to determine the same face image as the face image that had been determined to be the face image for the AF at step S305. In actuality, the above-described processing is continuously performed after step S305.

Of the face images detected at step S311, the same face image as the face image that had been determined to be the subject for the AF at step S305 is subjected to the face detection AF at step S312. Thus, the AF is actually performed just before the image capturing is performed even though the face image for the AF is determined at step S305. Therefore, even though the face image for the AF is moved after the image-capturing instruction operation is performed, the AF can be appropriately performed based on the position of the face image shown just before the image capturing is performed.

After the face detection AF is finished, the processing advances to step S313 and is held until the self-timer time measurement is finished. After the self-timer time measurement is finished, the processing advances to step S314 so that the image capturing processing (actual image capturing) is performed based on the result of the face detection AF performed at step S312, and the self-timer image capturing processing 3 is finished.

On the other hand, if it is determined that no face image is shown at step S304, the processing advances to step S315. Since processing procedures performed at steps S315, S316, S317, S318, S319, S320, S321, S322, and S3223 are the same processing procedures as those performed at steps S112 to S121 that are shown in FIG. 2, the descriptions thereof will be omitted.

Even though the position of the face image for the AF is moved during the self-timer time measurement, the above-described embodiment allows for performing the AF based on the moved position so that focusing is appropriately obtained and image capturing is performed. Further, the photographer can select and confirm for which of face images shown on the photographic image plane the AF should be performed before an instruction to perform the self-timer image capturing is issued (before the time measurement is performed). If it is determined that no face image is shown on the photographic image plane before the self-timer time measurement is started, the face detection is performed on the photographic image plane just before the self-timer time measurement is finished. If the face image is detected, the AF is performed for the detected face image and image capturing is performed. Consequently, if the image of the photographer appears on the photographic image plane during the self-timer time measurement, the AF is performed for the face image of the photographer and image capturing is performed.

According to each of the above-described embodiments, the face detection can be performed before the self-timer time measurement is started (before the image capturing instruction is accepted) during the self-timer image capturing, and the time when the AF is performed can be automatically and appropriately changed based on whether or not the face image is produced on the photographic image plane. If it is determined that at least one face image is produced on the photographic image plane before the self-timer time measurement is started, it may be considered that a subject for which the photographer wishes to perform the face detection AF had already existed in the angle of view. In that case, therefore, the subject for the face detection AF is determined before an instruction to perform the self-timer image capturing is issued (before the time measurement is performed) and the photographer is notified of the determination result. Consequently, the photographer can confirm for which of the face images produced on the photographic image plane the AF should be performed before the instruction to perform the self-timer image capturing is issued (before the time measurement is performed). If it is determined that no face image is produced on the photographic image plane before the self-timer time measurement is started, it may be considered that the subject for which the photographer wishes to perform the face detection AF does not exist in the angle of view. In that case, therefore, the face detection is performed on the photographic image plane just before the self-timer time measurement is finished, that is, after the image capturing instruction is accepted. If the face image is detected, the AF is performed for the detected face image and image capturing is performed. Consequently, if the image of the photographer appears on the photographic image plane during the self-timer time measurement, it becomes possible to perform the AF for the face image of the photographer and image capturing.

In each of the above-described embodiments, the self-timer image capturing is described as exemplary automatic image capturing. However, without being limited to the self-timer image capturing, the present invention can be used for any automatic image capturing so long as image capturing can be automatically performed under the stipulation that a predetermined requirement is satisfied after the photographer issues the image capturing instruction. For example, the present invention can be used for automatic image capturing triggered by an increase in the number of detected face images after the photographer issues the image capturing instruction. In that case, the face detection is performed before the photographer issues the image capturing instruction. If at least one face image is detected, a face image for the AF is selected from among the at least one detected face image and the photographer is notified of the determination result. On the other hand, if no face image is detected through the face detection performed before the image capturing instruction is issued, the photographer is notified that a target for the AF is determined and the AF is performed after the image capturing instruction is issued. If the at least one face image is detected after the image capturing instruction is issued, the AF is performed for the detected face image and image capturing is performed. If no face image is detected, the single-center-point AF or the like is performed for the detected face image and image capturing is performed. Consequently, the same advantages as those obtained in the above-described embodiments can be achieved.

Further, in each of the above-described embodiments, the time when the AF is performed is changed according to whether or not the face image is shown before the time measurement is started. However, the present invention can be used to set the image capturing conditions including not only the AF but also the AE, the flash light quantity, the AWB, and so forth.

Further, even though the face detection is exemplarily described as the subject detection in each of the above-described embodiments, the present invention can be used for any subject detection without being limited to the face detection so long as at least one of the image of an eye, the image of an object having a predetermined color, the image of a predetermined object is detected and the image capturing condition is set based on the detected image.

Further, the processing procedures performed in each of the above-described embodiments may be performed by supplying a storage medium storing the program code of software embodying each of the functions to a system and/or an apparatus so that a computer (a central processing unit (CPU) and/or a microprocessing unit (MPU)) of the system and/or the apparatus reads and executes the program code stored in the storage medium so that the functions of the above-described embodiments can be achieved. In that case, the program code itself, read from the storage medium, achieves the functions of the above-described embodiments, and thus the storage medium storing the program code constitutes an embodiment of the present invention. The storage medium for providing the program code may be, for example, a floppy (registered trademark) disk, a hard disk, an optical disk, a magneto-optical disk, a compact disk (CD) read only memory (ROM), a CD-recordable (R), a magnetic tape, a nonvolatile memory card, a ROM, and so forth.

Furthermore, not only by the computer reading and executing the program code, but also by the computer executing part of or the entire actual processing by utilizing an operating system (OS), etc. running on the computer based on instructions of the program code, the functions of the above-described embodiments may be achieved. The latter is also one of embodiments of the present invention.

According to another embodiment of the present invention, the program code read from the storage medium may be written into a memory provided in a function expansion board inserted into the computer and/or a function expansion unit connected to the computer. After that, a CPU or the like provided in the function expansion board and/or the function expansion unit may execute part of or the entire actual processing based on instructions of the program code so that the functions of the above-described embodiments are realized, which constitutes another embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-185983 filed on Jul. 17, 2008, which is hereby incorporated by reference herein in its entirety.

What is claimed is:

1. An image pickup device comprising:
   an image pickup unit;
   a subject detecting unit configured to detect a predetermined subject from an image picked up through the image pickup unit;
   a determining unit configured to determine whether a subject for which an image capturing condition should be set exists on the image based on a result of the detection by the subject detecting unit, wherein the image capturing condition includes at least one of a focus setting, an exposure setting, a flash light amount setting, and a white balance setting;
   a determination unit configured to determine the subject for which the image capturing condition should be set before an image capturing instruction from a user is accepted in response to a result of the determination made by the determining unit being true;
   a notification unit arranged to notify the user of the subject for which the image capturing condition should be set determined by the determination unit before the image capturing instruction is accepted;
   an accepting unit configured to accept the image capturing instruction from the user;
   a setting unit configured to set the image capturing condition based on the determined subject determined by the determination unit in response to a result of the determination made by the determining unit being true and set the image capturing condition based on a result of the detection performed by the subject detecting unit after the image capturing instruction is accepted by the accepting unit in response to the result of the determination made by the determining unit being false; and
   an actual image capturing unit configured to control the image pickup unit so that actual image capturing is performed in response to a predetermined requirement being satisfied after the image capturing instruction is accepted under the image capturing condition set through the setting unit.

2. The image pickup device according to claim 1, wherein the predetermined subject is at least one of a face and an eye of a person, and an object having a predetermined color.

3. The image pickup device according to claim 1, wherein a predetermined condition denotes that at least one subject is detected by the subject detecting unit.

4. The image pickup device according to claim 1, wherein a predetermined condition denotes that the subject detecting unit detects at least one subject from an area of part of the image picked up through the image pickup unit.

5. The image pickup device according to claim 1, wherein the image capturing condition set by the setting unit is at least one of a focus setting, an exposure setting, a flash light amount setting, and a white balance setting.

6. The image pickup device according to claim 1, wherein the actual image capturing unit is a unit configured to perform control so that self-timer image capturing is performed, and the predetermined requirement denotes that a predetermined time period elapses after the image capturing instruction is accepted.

7. The image pickup device according to claim 1, wherein the subject detected by the subject detecting unit is a face of a person, and
   wherein the predetermined requirement denotes that a number of at least one face detected by the subject detecting unit becomes larger than in a case where the image capturing instruction is accepted.

8. The image pickup device according to claim 1, wherein in response to the determining unit determining that the detection result satisfies a predetermined condition, the setting unit sets the image capturing condition based on the subject determined by the determination unit before the image capturing instruction is accepted.

9. The image pickup device according to claim 8, further comprising a change determining unit configured to determine whether there is a change in a position, a size, and a number of at least one subject detected by the subject detecting unit after the image capturing instruction is accepted,
   wherein in response to the change determining unit determining that there is the change, the setting unit changes settings on the image capturing condition in response to the settings on the image capturing condition having already been made.

10. The image pickup device according to claim 9, wherein the change determining unit determines whether there is a change in a subject determined by the determination unit to be the subject for which the image capturing condition should be set.

11. The image pickup device according to claim 9, further comprising a warning unit configured to issue a warning in response to the settings on the image capturing condition being changed by the setting unit.

12. The image pickup device according to claim 9, further comprising a stillness determining unit configured to determine whether the subject detected by the subject detecting unit stands still in response to the change determining unit determining that there is the change,
   wherein the setting unit changes the settings on the image capturing condition after the stillness determining unit determines that the subject stands still.

13. The image pickup device according to claim 1, wherein in response to the determining unit determining that the detection result satisfies a predetermined condition, the setting unit sets the image capturing condition based on a subject equivalent to the subject determined by the determination unit after the image capturing instruction is accepted.

14. The image pickup device according to claim 1,
   wherein, in response to a result of the determination made by the determining unit being false, the determination unit determines the subject for which the image capturing condition should be set after accepting the image capturing instruction from a user, wherein, in response to a result of the determination made by the determining unit being true, the notification unit performs the notification, and wherein, in response to a result of the determination made by the determining unit being true, the subject for which the image capturing condition should be set which is determined by the determination unit before accepting an image capturing instruction from a user, is not changed until accepting the image capturing instruction and performing an actual image capturing by the actual image capturing unit.

15. A method of controlling an image pickup device including an image pickup unit, the method comprising detecting a predetermined subject from an image picked up through the image pickup unit;

determining whether a subject for which an image capturing condition should be set exists on the image based on a result of the detection, wherein the image capturing condition includes at least one of a focus setting, an exposure setting, a flash light amount setting, and a white balance setting;

determining the subject for which the image capturing condition should be set before an image capturing instruction from a user is accepted in response to a result of the determination being true;

notifying the user of the subject for which the image capturing condition should be set determined before the image capturing instruction is accepted;

accepting the image capturing instruction from the user;

setting the image capturing condition based on the determined subject determined in response to a result of the determination being true and set the image capturing condition based on a result of the detection performed after the image capturing instruction is accepted at the accepting in response to the result of the determination being false; and controlling the image pickup unit so that actual image capturing is performed in response to a predetermined requirement being satisfied after the image capturing instruction is accepted under the set image capturing condition.

16. A non-transitory computer readable recording medium storing a program that causes a computer to perform the method according to claim 15.

* * * * *